United States Patent [19]

Pearson

[11] 4,113,688

[45] Sep. 12, 1978

[54] PROCESS FOR RAPIDLY DISSOLVING GELS OF WATER-SOLUBLE POLYMERS BY EXTRUSION, CUTTING AND THEN SLURRYING UNDER HIGH SHEARING FORCES

[75] Inventor: Stephen C. Pearson, Wilmington, Del.

[73] Assignee: Hercules Incorporated, Wilmington, Del.

[21] Appl. No.: 860,423

[22] Filed: Dec. 14, 1977

[51] Int. Cl.$^2$ .............................................. C08L 33/02
[52] U.S. Cl. .................. 260/29.6 PM; 260/29.7 EM
[58] Field of Search ............... 260/29.6 PM, 29.7 EM

[56] References Cited

U.S. PATENT DOCUMENTS

| 3,251,389 | 5/1966 | Unschel et al. ...................... 146/239 |
| 3,282,874 | 11/1966 | Fredrich et al. ............. 260/29.6 PM |
| 3,862,078 | 1/1975 | Burke ........................... 260/29.6 PM |
| 3,979,349 | 9/1976 | Fink et al. .................... 260/29.6 PM |
| 4,055,517 | 10/1977 | Daimer ......................... 260/29.6 PM |

OTHER PUBLICATIONS

Knight, *Journal of Petroleum Technology*, 25 (5) pp. 618–626, 1973.

*Primary Examiner*—M. J. Welsh
*Attorney, Agent, or Firm*—Michael B. Keehan

[57] ABSTRACT

A process for rapidly forming dilute aqueous solutions of water-soluble polymer from gels of such polymers is provided. In the process polymer gel is extruded, cut, and slurried in water. The slurry of gel particles is subjected to high shear forces immediately after slurry formation to form a slurry of very fine gel particles. The slurry of fine gel particles is mixed with additional water under low shear conditions to form the dilute aqueous solution of polymer. The process reduces degradation of certain important polymer properties.

6 Claims, 2 Drawing Figures

PROCESS FOR RAPIDLY DISSOLVING GELS OF WATER-SOLUBLE POLYMERS BY EXTRUSION, CUTTING AND THEN SLURRYING UNDER HIGH SHEARING FORCES

BACKGROUND OF THE INVENTION

This invention relates to a process for rapidly dissolving water-soluble polymer gels in water to form dilute aqueous solutions of the water-soluble polymers.

More particularly, this invention relates to a process for rapidly dissolving a water-soluble polymer gel in water to produce a dilute solution of the polymer in such a manner that the degradation of physical properties of the polymer is substantially reduced or minimized during the rapid formation of a dilute solution of the polymer.

Water-soluble gels comprise a solution of a water-soluble polymer whose high molecular weight and concentration in solution result in a high viscosity solution. The high viscosity polymer solution, commonly referred to as a gel, cannot be transported by techniques used to transport liquids. For the most part, water-soluble polymer gels of high molecular weight and polymer concentration ranging from about 10 to about 50% by weight of the gel are tough, rubbery substances which retain their shape when placed on a flat surface.

Water-soluble gels are prepared by addition polymerization of water-soluble vinyl-type monomers. Such polymers include those prepared from any water-soluble monomers derived from acrylic or methacrylic acids or any of their amides, esters or salts which when polymerized alone or in conjunction with one or more other unsaturated monomers will yield water-soluble polymers.

Water-soluble polymers are not generally employed in commercial application in gel form but are usually employed as dilute aqueous solutions of the polymer. Prior art methods for conversion of water-soluble polymer gels to dilute aqueous solutions of the polymers have resulted in degradation of certain properties of the polymers, resulting from shearing of the polymer gel during the process of forming solutions of the polymers.

It is a principal object of this invention to provide a rapid process for dissolving a water-soluble polymer gel to produce a dilute aqueous solution of the polymer while substantially reducing or minimizing degradation of polymer properties.

SUMMARY OF THE INVENTION

In accordance with this invention, a process is provided for preparing dilute aqueous solutions of water-soluble polymers from polymer gels rapidly and with minimum degradation to polymer properties. The process of this invention comprises the steps of:
(a) extruding water-soluble polymer gels into flowing water through die holes in an extrusion die plate, said die holes having diameters of from at least about 0.06 to about 0.50 inch, forming polymer gel strands,
(b) cutting the extruding polymer gel strands at the exterior surface of the extrusion die plate to a length of less than about 0.75 inch, forming a slurry of the cut gel particles in the flowing water,
(c) subjecting the slurry of gel particles of step (b) to high shearing forces immediately after formation of said slurry such that no substantial dissolution of the gel particles occurs prior to subjecting of said particles to said high shearing forces, said forces being sufficient to reduce the particle size of the cut gel particles to less than about 0.030 inch in greatest dimension, and
(d) mixing the resultant slurry of fine gel particles and additional water under low shear conditions sufficient to maintain the suspension of particles in water, rapidly forming a dilute aqueous solution of polymer.

DETAILED DESCRIPTION OF THE INVENTION

Figure 1:
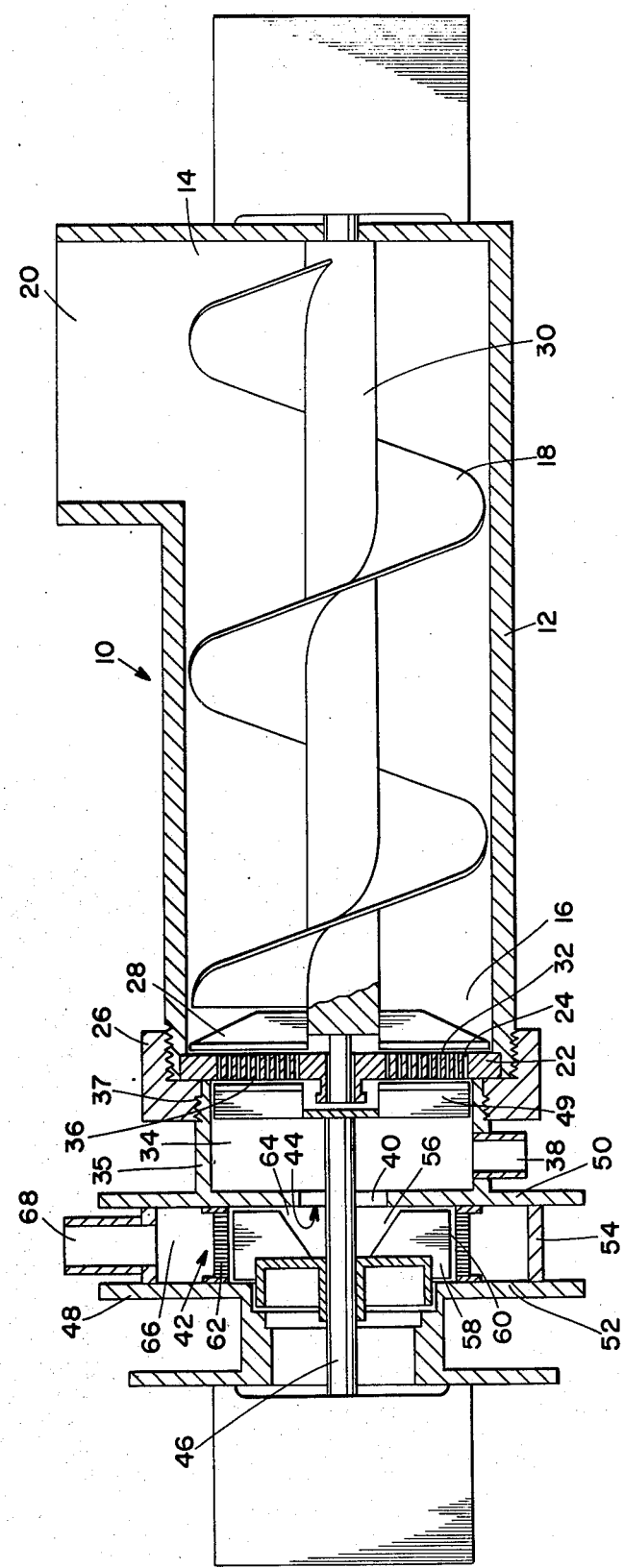

The water-soluble polymer gels which can be rapidly dissolved in accordance with the process of this invention are high molecular weight, water-soluble polymers having an intrinsic viscosity of at least 1 deciliter/gram (dl/g) measured in 2N sodium chloride at 25.5° C. Such gels contain from about 10% to about 50% by weight of polymer and from about 50 to about 90% by weight of water. Illustrative polymers include those prepared from monomers derived from acrylic or methacrylic acids, or any of their amides, esters or salts, which, when polymerized alone, or in conjunction with one or more other monomers, will yield a water-soluble polymer.

Specific examples of the polymers which are prepared in the form of gels and which can be dissolved by the process of this invention are:
polyacrylamide, polyacrylamide hydrolyzed with an organic or inorganic base;
cationic polyacrylamides, such as reaction products of polyacrylamide with dialkylamine plus formaldehyde (the Mannich reaction) or transamidation products of polyacrylamide with an alkyldiamine, such as N,N-dimethyl ethylene diamine;
copolymers of acrylamide and an anionic monomer, such as the salts of acrylic or methacrylic acid or a sulfonate-containing acrylamide based monomer, such as sodium-2-acrylamido-2-methyl propane sulfonate;
copolymers of acrylamide and a cationic monomer such as
(a) monomers prepared by reacting acrylates or methacrylates with dialkylamino alcohols, and having the general structural formula

where R, $R^1$ and $R^{11}$ are hydrogen, lower alkyl having 1–4 carbon atoms, or benzyl radicals and M = 1–5;
(b) monomers prepared by reacting acrylates and methacrylates with alkyldiamines, the resultant monomers having the general structural formula

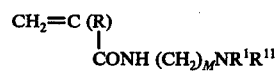

where R, $R^1$, $R^{11}$ are hydrogen, lower alkyl having 1–4 carbon atoms, or benzyl radicals and M = 1–5;
(c) diallyldimethylammonium chloride;
(d) salts prepared from the monomers described in (a) and (b) by reaction with mineral or organic acids;

(e) quaternary ammonium salts prepared from the monomers described in sections (a) and (b) by reaction with alkylating agents, such as lower alkyl halides or dialkylsulfates such as dimethyl sulfate, diethyl sulfate, methylethyl sulfate, methyl chloride, ethyl chloride, methyl iodide, methyl bromide and the like.

homopolymers of the anionic acrylamide based monomers such as poly(sodium acrylate), poly(sodium-2-acrylamido-2-methyl propane sulfonate), and the like;

homopolymers of any of the cationic acrylamide based monomers described above, and the like.

The polymer gel which can be rapidly dissolved in accordance with the process of this invention may also contain nonpolymeric materials designed to stabilize the polymer, or to modify its physical or chemical properties in some way. These might include antioxidants and substances designed to lower the viscosity of the resultant gel solution by increasing its ionic strength, such as inorganic or organic salts, buffer systems, or pH modifiers.

In the first step in the process of this invention polymer gels as heretofore described are extruded in conventional extrusion equipment through a die plate into a large excess of water. The size of the holes in the die plate through which the polymer gels are extruded is preferably at least about 0.06 inch and up to about 0.50 inch in diameter. If the die hole diameter decreases below 0.06 inch the heat build-up in the extruder becomes significant and can cause cross-linking of the polymer and degradation to polymer physical properties.

The extruding polymer gel strands are sheared into short segments at the exterior surface of the die plate in the presence of water. Shearing of the gel strands in the presence of water is critical. The water functions to cool the sheared gel particles, to lubricate the cutting means and to provide a transport means for the gel particles. The amount of water into which the gel is sheared is controlled so that the gel particles comprise from about 5 to about 20% by weight of the water-gel mixture. Preferably, the shearing of the extruding polymer gel strand is accomplished by cutting blades mounted at the exterior surface of the die plate. The shearing action can be imparted to the gel strand by extruding the gel into a rotating blade mounted at the exterior surface of the die plate and turning at speeds of at least 100 rpm and preferably turning at speeds of 1500 rpm or higher. Shearing of the extruding polymer gel strands is controlled so that the length of polymer strands being cut is less than 0.75 inch and is preferably from about 0.125 inch to less than 0.75 inch. The gel particles resulting from shearing of the polymer gel strand in water are substantially instantaneously slurried in water due to the agitation action of the cutting blades in the water.

The second size reduction step in the process of this invention must occur before any substantial dissolution of the gel particles slurried in water occurs, since it is the effect of shear on polymer solutions that is the principal factor responsible for degradation of the physical properties of the water-soluble polymers. In this size reduction step the aqueous slurry of gel particles is subjected to a high shearing force sufficient to reduce the average maximum dimension of the gel particles to less than about 0.030 inch. The high shearing forces must be applied to the slurry of polymer particles as quickly after slurry formation as possible and before any substantial dissolution of the gel particles occurs. In practice, it is preferable to subject the slurry of gel particles to high shear forces within several seconds of the formation of the slurry. The high shear force required to reduce the gel particle size to less than 0.030 inch in largest dimension can be imparted by a number of devices including:

(a) devices for accelerating the gel slurry linearly and adapted to impinge said slurry on fixed cutting surfaces;

(b) devices for subjecting the gel slurry to the cutting action of high speed knives in a manner similar to the action of a blender;

(c) homogenizing devices for passing the gel slurry under high pressure through a small orifice in a manner similar to the techniques used to emulsify oil and water;

(d) devices having a scissoring action arising from the relative motion of two knives; in such devices gels are passed between a closely fitted, slotted, rotor and stater, or the slurry of gel particles is passed between two slotted, closely associated, plane surfaces, one of which is moving relative to the other in a rotational or linear manner; and (e) devices for passing the gel slurry between two closely associated plane surfaces, one of which is moving relative to the other in a manner similar to an attrition or tissue mill.

A particularly suitable device for imparting high shear forces to the gel is a device which radially accelerates the gel slurry for impingement of the slurry on a series of spaced, stationary cutting surfaces. In this type of device the particle size is controlled by the spacing between adjacent cutting surfaces through which the polymer gel particles are forced radially. Such devices are described in U.S. Pat. Nos. 3,196,916 and 3,251,389, reference to which patents is hereby made.

Following the second size reduction step described above, the gel particles are mixed under low shear with additional water and a dilute aqueous solution of polymer rapidly forms. The mixing shear force employed is preferably the minimum shear necessary to maintain the tiny particles of polymer gel having a maximum average particle size of less than about 0.030 inch in suspension in water. During the final mixing stage additional water may be and preferably is added to the polymer slurry. The amount of water added is controlled so that aqueous solutions of desired polymer concentration are formed.

THE DRAWINGS

Figure 2:
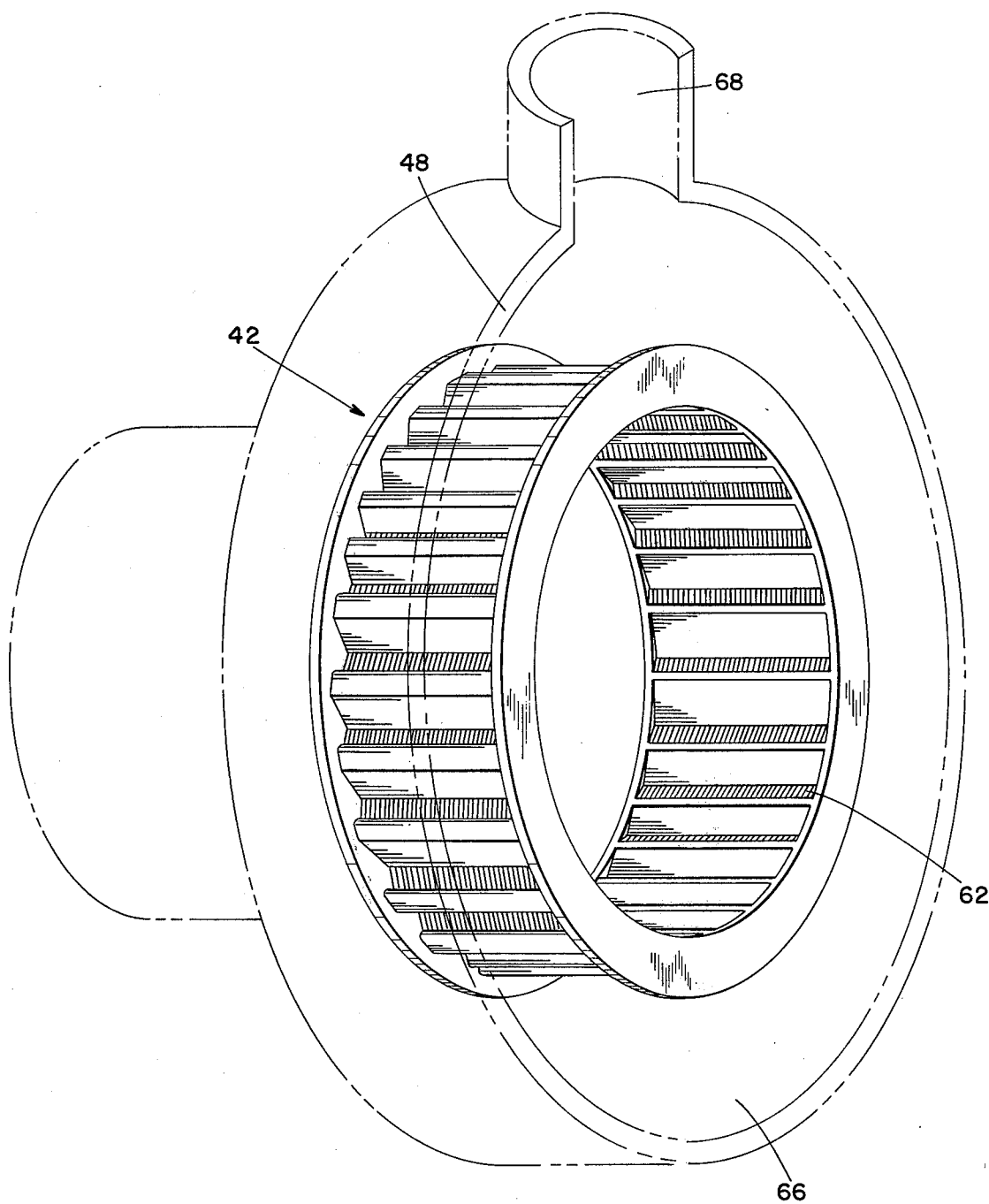

A suitable device for use in conducting the size reduction steps of the process of this invention is shown in the drawings in which FIG. 1 is a longitudinal view of an extrusion and comminution device for polymer gel, partly in section, and FIG. 2 is a partial perspective view of high speed cutting device further illustating the cutting surface shown in FIG. 1.

In FIG. 1 a device suitable for use in carrying out the size reduction steps of the process of this invention is illustrated. The device comprises an extruder 10 having an extruder housing 12 having a feed inlet end 14 and an outlet end 16. An extruder screw 18 is mounted for rotation within housing 12. A feed hopper 20 extends above housing 12 at the feed inlet end 14 and is in communication with housing 12. A die plate 22 having a multiplicity of die holes 24 is secured across the outlet end 16 of housing 12 by flange 26 which is threadedly secured to housing 12. A knife blade 28 is secured to the central axle 30 of screw 18 adjacent the interior surface 32 of die plate 22. The knife blade 28 rotates with the rotation of axle 30 providing a shearing force at the interior surface 32 of die plate 22. A receiving chamber 34 is in communication with the periphery of the exterior surface 36 of die plate 22. Receiving chamber 34 is formed by the intersection of collar 35 and flange 26 at threaded connection 37. Receiving chamber 34 has a liquid inlet 38 and an outlet 40. Outlet 40 is in communication with a high shear cutting device 42 and functions as the inlet to high shear cutting device 42. High shear cutting device 42 has an inlet 44 which is in communication with polymer receiving chamber 34. High shear cutting device 42 has a central impeller shaft 46 which passes through the center of housing 48 of cutting device 42 and through the center of receiving chamber 34. Impeller shaft 46 and the axle 30 of extruder screw 18 are in axial alignment. Cutting blades 49 are secured to impeller shaft 46 and are positioned adjacent exterior surface 36 of die plate 22. Housing 48 of cutting device 42 is comprised of a forward wall 50, rear wall 52 and peripheral wall 54. These walls define a central cavity 56. Impeller 58 is secured to impeller shaft 46 and is positioned such that the outside surfaces 60 of impeller 58 are directly adjacent cutting surface 62. Cutting surface 62 is comprised of a multiplicity of knife-like cutting edges spaced very closely together. A description of such a cutting surface is described in U.S. Pat. No. 3,251,389. Cutting surface 62 extends around the area swept by of impeller 58 and separates central cavity 56 into an inner cavity 64 and an annular cavity 66. Housing 48 has an outlet 68 in communication with annular cavity 66.

The cutting surface 62 is further illustrated in FIG. 2. In FIG. 2, only the housing 48 of high shear cutting device 42 and cutting surface 62 are illustrated for purposes of more clearly showing the relative relationship of the cutting surface 62 to the housing 48. Annular cavity 66 surrounds the entire cutting surface 62.

In a typical operation, polymer gel is compressed in the extruder 10 and passes in strand-like form through die holes 24 in die plate 22. High speed cutting blades 49 shear extruding gel strands into small particles. Liquid enters receiving chamber 34 through outlet 38 and sweeps the gel particles, slurried as a result of turbulence within the receiving chamber 34 through outlet 40 into central cavity 56 of the high shear cutting device 42. The impeller 58 radially accelerates the slurry, impinging the slurry on knife blades 62, reducing the size of the gel particles. The resulting tiny gel particles and liquid pass into annular space 66 and flow through outlet 68 into a low shear dissolving tank (not shown) where the gel particles and solvent are mixed under low shear conditions.

THE EXAMPLES

The process of this invention is further illustrated in the examples which follow. In the examples the effectiveness of the process of this invention is evaluated based upon certain properties of the polymer solutions prepared from a polymer gel in accordance with this process. The properties upon which the process of this invention are evaluated are bulk viscosity, screen factor and pituity.

Bulk viscosity of a polymer solution, commonly referred to as Brookfield viscosity, is a particularly important property of polymer solutions used in recovery of oil from subterranean formations by flooding methods. In flooding processes aqueous polymer solutions having high Brookfield viscosity are needed for efficient flooding operations. Brookfield viscosity is measured in centipoises with commercially available viscometers. In particular, Brookfield viscosity can be measured using a Model LVF viscometer fitted with a UL adapter and sold by Brookfield Laboratories. Viscosity is determined by measuring the drag on a bob rotating in a sleeve containing the polymer solution. Because the polymer solutions are pseudoplastic, which means that the viscosity of the solution is dependent on the shear conditions under which viscosity is determined, the Brookfield viscosity value always defines the shear conditions by referring to the speed at which the bob was rotating.

A second important property of aqueous polymer solutions to be used for oil recovery operations by flooding, is screen factor. Screen factor is the ratio of the time taken for a given volume of polymer solution to flow through five closely packed, randomly oriented, 100 mesh (U.S. Sieve Series) stainless steel screens, compared with the time required for the same volume of water to flow through the screens. The screens used are 0.25 inch in diameter, and their packing is adjusted until the time taken for 40 cc. of water to flow through them is between 8 and 11 seconds. Screen Factor has no absolute value, but tests have shown that the efficiency with which an aqueous polymer solution can displace oil from a subterranean formation is related directly to screen factor. A complete description of screen factor may be found in an article by B. L. Knight entitled "Reservoir Stability of Polymer Solutions", Journal of Petroleum Technology 25 (5), p. 618, (1973).

A third important property of aqueous polymer solutions to be used for oil recovery operations by flooding is pituity. This property is also important for polymer solutions to be employed as flocculants. Pituity is the tendency of a solution to form strings. Pituity is measured by dipping a ⅛-inch diameter steel rod into an aqueous solution of water-soluble polymer containing 0.05% by weight of water-soluble polymer, and then withdrawing the rod and raising it through a wide glass tube at constant speed. A string of solution trails behind the rod, and the height at which that string breaks, expressed in millimeters, is referred to as the pituity of the polymer. Pituity has no absolute meaning, but is related to the ability of the polymer to function as a flocculant for dilute suspensions.

Brookfield viscosity, screen factor and pituity of a polymer are related to the chemical composition of the polymer, its molecular weight, the linearity of its molecules, and the type of water in which it is dissolved. If all other factors are held constant, these parameters are most affected by the shear history of the polymer. Shear history is defined as a combination of the length of time the polymer has been sheared and the severity of the shear. It is difficult to define degrees of shear in absolute terms, especially when non-Newtonian fluids are being examined. Shear in a moving liquid might be defined as the average velocity gradient across each streamline lamella. In stirred non-Newtonian viscous liquid the velocity falls off rapidly in the vicinity of the stirrer's surface, so that the area and speed of the stirrer blades become the most important factors in determining shear. Other parameters which relate to shear history of a polymer are the volume and concentration of polymer in the solution and the total time of agitation of the polymer. These two parameters relate to the probability of a given polymer molecule being in high shear zones during mixing.

In the examples which follow shear is described by the process used to impart it, specifically by reference to a type of stirrer, its speed in revolutions per minute (rpm), the volume and concentration of the solution being stirred and the time during which the polymer solution is subjected to shear.

EXAMPLE 1

A high molecular weight copolymer of sodium acrylate (30 weight %) and acrylamide (70 weight %) was prepared. The polymer gel contains 20% by weight of polymer and has an intrinsic viscosity of 28.4 dl/gm measured in 2N NaCl at 25.5° C. Samples of said gel were dissolved in water by stirring equal solutions containing 0.2% by weight of gel at 10 rpm and 100 rpm, respectively. Average gel particle size was 0.25 inch in largest dimension. The mixtures are stirred in identical vessels with identical stirrers but at varying shear rates until all polymer gel particles were in solution as determined by visual examination of the solutions. These tests illustrate the effect of shear on certain polymer properties based on shear history during dissolution of the gel.

Table I

| Rate of Shear (rpm) | Brookfield Viscosity* (centipoises) | Screen Factor | Pituity (millimeters) |
|---|---|---|---|
| 10 | 28 | 46 | 185 |
| 100 | 26 | 34 | 170 |

*Observed using a Brookfield Model LVF viscometer with a UL adapter at 6 rpm.

EXAMPLE 2

Polymer gel as described in Example 1 was dissolved in water under the same conditions as those of Example 1 at a rate of shear of 100 rpm. The effect of shear on this polymer solution was then evaluated by subjecting equal volumes of polymer solution to additional shearing at 100, 200 and 400 rpm's using identical test equipment. Shearing at increasing rpm's resulted in degradation of certain properties of the polymer solutions. The results of these tests are summarized in Table II below.

Table II

| Rate of Shear (rpm) | Brookfield Viscosity* (centipoises) | Screen Factor (seconds) | Pituity (millimeters) |
|---|---|---|---|
| 100 | 26 | 34 | 170 |
| 200 | 27 | 27 | 140 |
| 400 | 20 | 14 | 105 |

*Measured with a Brookfield Model LVF viscometer with a UL adapter at 6 rpm.

EXAMPLES 3-6

A polymer gel which is a copolymer comprising 30 weight % sodium acrylate and 70 weight % acrylamide is extruded in a Autio Model 801 extruder having a die plate of 8⅜ inches diameter and having 834 die holes each having a diameter of 0.187 inch. The polymer gel contains 26% by weight of polymer and has an intrinsic viscosity of 28.6 dl/gram measured in 2N NaCl at 25.5° C. The extruding gel strands are cut at the inside surface of the extruder by rotating cutting blades mounted within the extruder adjacent the inside surface of said die plate to shear said gel as it passes into a die hole in the die plate. The cutting blades rotate at about 25 rpm. This extrusion and cutting operation is referred to as stage 1 of the process. The gel is extruded into a water filled receiving chamber surrounding the exterior surface of the die plate. At the exterior surface of the die plate is a second set of cutting blades adapted to shear the extruding gel strands. The cutting blades rotate at 1728 rpm. The cutting operation taking place in the water-filled receiving chamber is referred to as a stage 2 chopping process in Table III which follows. Slurries of gel particles resulting from the cutting operation heretofore described are mixed in large tanks having a volume capacity of 400 gallons. In tank #1 stirring is provided by a two propeller mixer turning at 400 rpm. The mixer used was a Mix Mor Model G-34 as described in Mix Mor Booklet No. 2108 and sold by Mix Mor Incorporated, Los Angeles, California. In tank #2 a low shear baffle type stirrer is employed operating at 30 rpm. The low shear mixer provides sufficient shear to maintain gel particles in suspension.

For comparison purposes polymer slurries (Examples 5, 6) prepared from stages 1 and 2 are immediately subjected, following formation of the slurry, to a very high shear force in a third stage size reduction device. In this stage the slurry of gel particles is radially accelerated by an impeller operating at 3600 rpm and impinged on a series of stationary knives such as illustrated in FIGS. 1 and 2. The spacing between adjacent knives in the apparatus is 0.030 inch. Such a device is available commercially as a Comitrol 3600 and manufactured by Urschel Laboratories Incorporated, Valparaiso, Indiana. The resulting slurry of particles in which each particle has a greatest dimension of about 0.030 inch is then dissolved in mixing tanks 1 and 2 described above. Results of this testing is set forth in Table III below.

TABLE III

| Ex. No. | Chopping Stages | Mixing Time (Hours) | Mixing (rpm) | Brookfield Viscosity (centipoise) | Screen Factor | Percent Gel Dissolved[c] |
|---|---|---|---|---|---|---|
| 3 | 1,2 | 2 | 400 (tank #1) | 6 | 15 | 58 |
| | | 3 | 400 | 12 | 16 | 72 |
| | | 4 | 400 | 13 | 17 | 83 |
| | | 5 | 400 | 12 | 18 | 88 |
| | | 6 | 400 | 13 | 18 | 91 |
| | | 7[a] | 400 | 17 | 21 | 100 |
| 4 | 1,2 | [b] | 30 (tank #2) | [b] | [b] | [b] |
| 5 | 1,2,3 | 1 | 400 (tank #1) | 15 | 25 | 100 |
| | | 2 | 400 | 16 | 21 | 100 |
| | | 3 | 400 | 16 | 20 | 100 |
| 6 | 1,2,3 | 1 | 30 (tank #2) | 15 | 25 | 100 |
| | | 2 | 30 | 17 | 25 | 100 |

TABLE III-continued

| Ex. No. | Chopping Stages | Mixing Time (Hours) | Mixing (rpm) | Brookfield Viscosity (centipoise) | Screen Factor | Percent Gel Dissolved[c] |
|---|---|---|---|---|---|---|
| | | 3 | 30 | 16 | 26 | 100 |
| | | 4 | 30 | 16 | 26 | 100 |

[a]Mixing consisted of 6 hours continuous mixing and 1 additional hour mixing after about 15 hours without mixing.
[b]Inadequate suspension of slurry in mixing tank results in settling of gel particles and failure to form polymer solution.
[c]Calculated by passing the solution through a 200 mesh (U.S. Sieve) screen, 100% dissolution defined as total solution passing through said screen.

Examples 5 and 6 represent solutions of polymer gel following the process of this invention. Example 6 represents the most preferred process in the low shear mixing of the tiny slurry particles and results in maximizing retention of desired polymer properties in solution. From review of the Brookfield viscosity, Screen Factor and percent gel dissolved (with time), the improvement in the properties of the polymer solutions prepared in accordance with this invention is apparent.

What I claim and desire to protect by Letters Patent is:

1. A process for preparing dilute aqueous solutions of water-soluble polymer having an intrinsic viscosity of at least one deciliter per gram measured in 2 normal sodium chloride 25.5 C. from gels of said polymer, said process comprising the steps of:
   (a) extruding the water-soluble polymer gels into flowing water through die holes in an extrusion die plate, said die holes having diameters of from at least about 0.06 inch to about 0.50 inch, forming polymer gel strands,
   (b) cutting the extruding polymer gel strands at the exterior surface of the extrusion die plate to a length of less than about 0.75 inch, forming a slurry of the cut gel particles in the flowing water,
   (c) subjecting the slurry of gel particles of step (b) to high shearing forces immediately after formation of said slurry such that no substantial dissolution of the gel particles occurs prior to subjecting of said particles to said high shearing forces, said forces being sufficient to reduce the particle size of the cut gel particles to less than about 0.030 inch in greatest dimension, and
   (d) mixing the resultant slurry of fine gel particles and additional water under low shear conditions sufficient to maintain the suspension of particles in water, rapidly forming a dilute aqueous solution of polymer.

2. The process of claim 1 in which the gel contains from 10 to 50% by weight of polymer and 90 to 50% by weight of water.

3. The process of claim 2 in which the polymer is a polymer of acrylamide.

4. The process of claim 1 in which the polymer strands are cut to length of from about 0.125 inch to less than about 0.75 inch.

5. The process of claim 4 in which the slurry of gel particles of step (b) is subjected to a high shearing force by radially accelerating said slurry for impingement upon a cutting surface comprising cutting blades in which the maximum distance between adjacent cutting blades is about 0.30 inch.

6. The process of claim 1 in which the slurry of gel particles and water of step (b) comprises by weight from about 5 to about 20% polymer and from 80 to 95% water.

* * * * *

UNITED STATES PATENT AND TRADEMARK OFFICE
CERTIFICATE OF CORRECTION

PATENT NO. : 4,113,688

DATED : September 12, 1978

INVENTOR(S) : Stephen C. Pearson

It is certified that error appears in the above-identified patent and that said Letters Patent are hereby corrected as shown below:

In the claims, Col. 9, Claim 1, line 26
"25.5C." should read --25.5°C.--.

In the claims, Col. 10, Claim 1, line 14 delete
"being sufficient to reduce" and insert -- reducing--.

Signed and Sealed this

Fifth Day of December 1978

[SEAL]

Attest:

RUTH C. MASON
Attesting Officer

DONALD W. BANNER
Commissioner of Patents and Trademarks